3,373,212
CERTAIN 2,3-DINITRO-5,8-ALKANO-5,6,7,8-
TETRAHYDRONAPHTHALENES
Hiroshi Tanida, Osaka-shi, and Ryonosuke Muneyuki, Itami-shi, Japan, assignors to Shionogi & Co., Ltd., Osaka-shi, Japan
No Drawing. Original application Jan. 22, 1965, Ser. No. 427,470, now Patent No. 3,336,331, dated Aug. 15, 1967. Divided and this application Apr. 25, 1967, Ser. No. 647,269
Claims priority, application Japan, Jan. 24, 1964, 39/3,392, 39/3,393
6 Claims. (Cl. 260—645)

ABSTRACT OF THE DISCLOSURE 2,3 - dinitro-5,8-alkano-5,6,7,8-tetrahydronaphthalenes of the formula

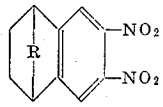

which are obtained by nitrating the corresponding 5,8-alkano - 5,6,7,8 - tetrahydronaphthalenes, are useful intermediates in the production of 5,8-alkano - 5,6,7,8-tetrahydro - 1H - naphtho[2,3-d]imidazoles of the formula

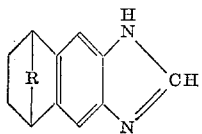

which are useful analgesic agents.

---

The present application is a division of copending application Ser. No. 427,470, filed Jan. 22, 1965; now U.S. Patent No. 3,336,331.

The present invention relates to 2,3-dinitro-5,8-alkano-5,6,7,8-tetrahydronaphthalenes of the formula

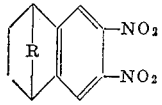

wherein R is methylene or ethylene. The compounds (I) are useful as intermediates for the preparation of the corresponding 5,8 - alkano - 5,6,7,8 - tetrahydro - 1H-naphtho[2,3-d]imidazoles which are useful as analgesic agents (cf. Patent No. 3,336,331).

Accordingly it is an object of this invention to provide novel intermediates of Formula I, useful in the preparation of the corresponding analgesic compounds of the formula

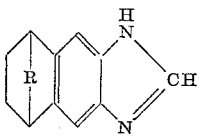

According to the present invention, an intermediate I is prepared by nitrating the corresponding 5,8 - alkano-5,6,7,8-tetrahydronaphthalene of the formula

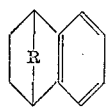

By reducing the resulting 2,3 - dinitro - 5,8 - alkano-5,6,7,8-tetrahydronaphthalene I and reacting the resultant 2,3 - diamino - 5,8-alkano-5,6,7,8-tetrahydronaphthalene represented by the formula:

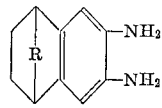

wherein R has the same significance as designated above, with formic acid, the corresponding Compound II can be obtained.

The starting 5,8 - alkano - 5,6,7,8 - tetrahydronaphthalene (III) is known and can be prepared, for instance, by reacting cyclopentadiene or 1,3-cyclohexadiene with benzene according to the Diels Alder reaction and hydrogenating the resultant 5,8 - alkano - 5,8 -dihydronaphthalene [H. E. Simmons: J. Am. Chem. Soc., 83 p. 1657 (1961)].

The 5,8 - alkano - 5,6,7,8 - tetrahydronaphthalene (III) is nitrated to the 2,3 - dinitro - 5,8 - alkano - 5,6,7,8-tetrahydronaphthalene (I) by treating the 5,8-alkano-5,6,7,8 - tetrahydronaphthalene (III) with a conventional nitrating agent such as a mixture of nitric acid and sulfuric acid, a mixture of nitric acid and acetic anhydride, a mixture of an alkali nitrate and sulfuric acid or benzoyl nitrate, if necessary, in an inert solvent (e.g. acetic acid, nitromethane, nitrobenzene, chloroform, carbon tetrachloride). Depending on the used nitrating agent, there may be obtained as a main product not the 2,3-dinitro - 5,8 - alkano - 5,6,7,8 - tetrahydronaphthalene (I) but the 2 - nitro - 5,8 - alkano - 5,6,7, 8 - tetrahydronaphthalene represented by the formula:

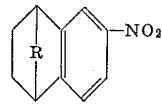

wherein R has the same significance as designated above. The 2 - nitro - 5,8 - alkano - 5,6,7,8 - tetrahydronaphthalene (I) can be readily nitrated to the 2,3-dinitro-5,8-alkano-5,6,7,8-tetrahydronaphthalene (I) by treating again with the said nitrating agent. The resulting 2,3-dinitro - 5,8 - alkano - 5,6,7,8 - tetrahydronaphthalene (I) can then be subjected to reduction to give the 2,3-diamino - 5,8 - alkano - 5,6,7,8 - tetrahydronaphthalene (IV). For the reduction, there may be adopted such a conventional procedure for converting a nitro group into an amino group as reduction using a metal (e.g. zinc, iron, tin) with an acid or alkali, reduction using a metal hydride complex (e.g. lithium aluminum hydride), catalytic reduction using a catalyst (e.g. Raney nickel, platinum dioxide) or electrolytic reduction. The resultant 2,3-diamino - 5,8 - alkano - 5,6,7,8 - tetrahydronaphthalene (IV) can then be reacted with formic acid to give the objective 5,8-alkano-5,6,7,8-tetrahydro-1H-naphtho[2,3-d]-imidazole (II). The reaction may be usually carried out at room temperature (10 to 30° C.) or while heating on a water bath.

The thus obtained 5,8-alkano - 5,6,7,8 - tetrahydro-1H-naphtho[2,3-d]imidazoles (I) are useful as analgesic agents.

Presently-preferred embodiments of the present invention are shown in the following examples. The relationship of parts by weight to parts by volume is the same as that between grams and milliliters. Temperatures are set forth in degrees centigrade.

Example 1

(A) Preparation of 2,3 - dinitro-5,8-methano-5,6,7,8-tetrahydronaphthalene:

To a solution of 5,8-methano-5,6,7,8-tetrahydronapthalene (17.0 parts by weight) in 80% sulfuric acid (45 parts by weight), there is added portionwise fuming nitric acid ($d=1.5$) (7.9 parts of weight) while cooling at 8 to 10° C., and the resultant mixture is stirred for 1.5 hours while cooling with ice-water. Further stirring is continued at room temperature (10 to 30° C.) for 1.5 hours. The reaction mixture is poured onto ice-water and shaken with ether. The ether layer is washed with water and 5% sodium bicarbonate solution in order, dried over anhydrous sodium sulfate and the solvent evaporated. The residue is distilled under reduced pressure to give a fraction (18.3 parts by weight) boiling at 148 to 151° C./7.0 mm. Hg. The fraction is chromatographed on alumina to give 2 - nitro-5,8-methano-5,6,7,8-tetrahydronaphthalene (8.2 parts by weight) as an oil boiling at 140 to 142° C./6.0 mm. Hg. $n_D^{26}=1.5855$. The oil (2.8 parts by weight) is dissolved in 90% sulfuric acid (50.0 parts by weight) and potassium nitrate (1.6 parts by weight) portionwise added thereto at 50 to 60° C. The resultant mixture is stirred at 60° C. for 1 hour. The reaction mixture is poured onto ice water and shaken with ether. The ether layer is washed with water and 5% sodium bicarbonate solution in order, dried over anhydrous sodium sulfate and the solvent evaporated. The residue is crystallized from ether to give 2,3-dinitro-5,8-methano-5,6,7,8-tetrahydronaphthalene (2.1 parts by weight) as crystals melting at 146.7 to 147.2° C.

(B) Preparation of 2,3-diamino-5,8-methano-5,6,7,8-tetrahydronaphthalene:

To a solution of 2,3-dinitro-5,8-methano-5,6,7,8-tetrahydronaphthalene (1.0 part by weight) in ethanol (50.0 parts by volume), there is added platinum dioxide (0.1 part by weight), and hydrogen gas is introduced into the resultant mixture while shaking. After hydrogen gas (650 parts by volume) is absorbed in 1.5 hours, the resultant mixture is filtered to remove the catlyst and concentrated under reduced pressure to give 2,3-diamino-5,8-methano - 5,6,7,8 - tetrahydronaphthalene (0.8 part by weight) as a yellow solid.

(C) Preparation of 5,8-methano-5,6,7,8-tetrahydro-1H-naphtho[2,3-d]imidazole:

2,3 - diamino - 5,8-methano-5,6,7,8-tetrahydronaphthalene (0.8 part by weight) is combined with formic acid (5.0 parts by volume) and heated on a steam bath for 2 hours. The reaction mixture is poured onto ice, made alkaline with sodium carbonate and shaken with ether. The other layer is washed with water, dried over anhydrous sodium sulfate and the solvent evaporated. The residue is crystallized from benzene to give 5,8-methano-5,6,7,8-tetrahydro-1H-naptho[2,3-d]imidazole (0.5 part by weight) as crystals melting at 198.5 to 199.5° C.

Example 2

(A) Preparation of 2,3-dinitro - 5,8-methano-5,6,7-8-tetrahydronaphthalene:

To a solution of 5,8-methano-5,6,7,8-tetrahydronapthalene (0.7 part by weight) in nitromethane (20.0 parts by volume), there is added portionwise a mixture of fuming nitric acid ($d=1.5$) (2.5 parts by weight) and conc. sulfuric acid (77.0 parts by weight) while cooling at 2 to 4° C., and the resultant mixture is stirred at room temperature (10 to 30° C.) for 2 hours. The reaction mixture is poured onto ice-water and shaken with ether. The ether layer is washed with water and 5% sodium bicarbonate solution in order, dried over anhydrous sodium sulfate and the solvent evaporated. The residue is distilled under reduced pressure to give a fraction (0.7 part by weight) boiling at 148 to 151° C./7.0 mm. Hg. The fraction is chromatographed on alumina to give 2-nitro-5,8-methano-5,6,7,8-tetrahydronapthalene (0.6 part by weight) as an oil boiling at 140 to 142° C./6.0 mm. Hg. The oil (0.6 part by weight) is dissolved in 90% sulfuric acid (12.2 parts by weight) and potassium nitrate (0.4 parts by weight) portionwise added thereto at 50 to 60° C. The resultant mixture is stirred at 60° C. for 1 hour. The reaction mixture is poured into ice water and shaken with ether. The other layer is washed with water and 5% sodium bicarbonate solution in order, dried over anhydrous sodium sulfate and the solvent evaporated. The residue is crystallized from ether to give 2,3-dinitro-5,8-methano - 5,6,7,8 - tetrahydronaphthalene (0.5 part by weight) as crystals melting at 146.7 to 147.2° C.

(B) Preparation of 2,3-diamino-5,8-methano-5,6,7,8-tetrahydronaphthalene:

2,3-dinitro-5,8-methano - 5,6,7,8 - tetrahydronaphthalene is catalytically reduced to 2,3-diamino-5,8-methano-5,6,7,8-tetrahydronaphalene in the same manner as in Example 1(B).

(C) Preparation of 5,8-methano-5,6,7,8-tetrahydro-1H-naphtho[2,3-d]imidazole:

2,3 - diamino - 5,8-methano-5,6,7,8-tetrahydronaphthalene is reacted with formic acid in the same manner as in Example 1(C) to give 5,8-methano-5,6,7,8-tetrahydro-1H-naptho[2,3-d]imidazole.

Example 3

(A) Preparation of 2,3-dinitro - 5,8-methano-5,6,7,8-tetrahydronaphthalene:

To a solution of 5,8 - methano - 5,6,7,8 - tetrahydronaphthalene (6.0 parts by weight) in nitromethane (60.0 parts by volume), there is added portionwise a mixture of fuming nitric acid (9.6 parts by weight) and conc. sulfuric acid (38.5 parts by weight) while cooling around 10° C., and the resultant mixture is stirred at room temperature (10 to 30° C.) for 1 hour. Further stirring is continued at 40° C. for 40 minutes. The reaction mixture is poured onto ice and shaken with ether. The ether layer is washed with water and 5% sodium bicarbonate solution in order, dried over anhydrous sodium sulfate and the solvent evaporated. The residue is crystallized from ethanol to give 2,3-dinitro-5,8-methano-5,6,7,8 - tetrahydronaphthalene (6.4 parts by weight) as crystals melting at 146.7 to 147.2° C.

(B) Preparation of 2,3 - diamino - 5,8 - methano-5,6,7,8-tetrahydronaphthalene:

2,3 - dinitro - 5,8 - methano - 5,6,7,8 - tetrahydronaphthalene is catalytically reduced to 2,3 - diamino-5,8-methano - 5,6,7,8 - tetrahydronaphthalene in the same manner as in Example 1(B).

(C) Preparation of 5,8 - methano - 5,6,7,8-tetrahydro-1H-naphtho[2,3-d]imidazole:

2,3 - diamino - 5,8 - methano - 5,6,7,8 - tetrahydronaphthalene is reacted with formic acid in the same manner as in Example 1(C) to give 5,8 - methano - 5,6,7,8-tetrahydro-1H-naphtho[2,3-d]imidazole.

Example 4

(A) Preparation of 2,3 - dinitro - 5,8 - ethano - 5,6,7,8-tetrahydronaphthalene:

To a solution of 5,8 - ethano - 5,6,7,8 - tetrahydronaphthalene (6.1 parts by weight) in nitromethane (250.0 parts by volume), there is added portionwise a mixture of fuming nitric acid ($d=1.5$) (2.7 parts by weight) and conc. sulfuric acid (74.5 parts by weight) while cooling with ice, and the resultant mixture is stirred at 0 to 4° C. for 1 hour. The reaction mixture is poured onto ice and shaken with ether. The ether layer is washed with water and 5% sodium bicarbonate solution in order, dried over anhydrous sodium sulfate and the solvent evaporated. The residue is distilled under reduced pressure to give a fraction (6.9 parts by weight) boiling at 140° C./1.0 mm. Hg. The fraction is treated with methanol to give 2 - nitro - 5,8 - ethano - 5,6,7,8 - tetrahydronaphthalene (5.7 parts by weight) as crystals melting at 71° C. The crystals (1.0 part by weight) are dissolved in nitromethane (20.0 parts by volume), and a mixture of fuming nitric acid ($d=1.5$) (2.5 parts by weight) and conc. sulfuric acid (77.1 parts by weight) is added thereto while cooling at 2 to 4° C. The resultant mixture is stirred at the same temperature for 1.5 hours. The reaction mixture is poured onto ice water and shaken with ether. The ether layer is washed with water and 5% sodium bicarbonate solution in order, dried over anhydrous sodium sulfate and the solvent evaporated. The residue is crystallized from methanol to give 2,3-dinitro-5,8 - ethano - 5,6,7,8 - tetrahydronaphthalene (0.6 part by weight) as crystals melting at 157 to 158° C.

(B) Preparation of 2,3 - diamino - 5,8 - ethano-5,6,7,8-tetrahydronaphthalene:

To a solution of 2,3 - dinitro - 5,8 - ethano - 5,6,7,8-tetrahydronaphthalene (1.4 parts by weight) in ethanol (30.0 parts by volume), there is added platinum dioxide (0.1 part by weight), and hydrogen gas is introduced into the resultant mixture while shaking. After hydrogen gas (760 parts by volume) is absorbed in 1.5 hours, the reaction mixture is filtered to remove the catalyst and concentrated under reduced pressure to give 2,3 - diamino-5,8 - ethano - 5,6,7,8 - tetrahydronaphthalene (1.1 parts by weight) as a yellow solid.

(C) Preparation of 5,8 - ethano - 5,6,7,8 - tetrahydro-1H-naphtho[2,3-d]imidazole:

2,3 - diamino - 5,8 - ethano - 5,6,7,8 - tetrahydronaphthalene (1.1 parts by weight) is combined with formic acid (10.0 parts by volume) and heated on a steam bath for 2 hours. The reaction mixture is poured onto ice, made alkaline with sodium carbonate and shaken with ether. The ether layer is washed with water, dried over anhydrous sodium sulfate and the solvent evaporated. The residue is crystallized from benzene to give 5,8-ethano - 5,6,7,8 - tetrahydro - 1H - naphtho[2,3-d]imidazole (0.9 part by weight) as crystals melting at 227 to 228° C.

What is claimed is:

1. 2,3 - dinitro - 5,8 - alkano - 5,6,7,8 - tetrahydronaphthalene of the formula:

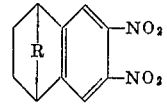

wherein R is a member selected from the group consisting of methylene and ethylene.

2. The compound: 2,3 - dinitro - 5,8 - methano-5,6,7,8-tetrahydronaphthalene.

3. The compound: 2,3 - dinitro - 5,8 - ethano-5,6,7,8-tetrahydronaphthalene.

4. 2 - nitro - 5,8 - alkano-5,6,7,8-tetrahydronaphthalene of the formula:

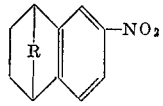

wherein R is a member selected from the group consisting of methylene and ethylene.

5. The compound: 2 - nitro - 5,8 - methano - 5,6,7,8-tetrahydronaphthalene.

6. The compound: 2 - nitro - 5,8 - ethano - 5,6,7,8-tetrahydronaphthalene.

References Cited

UNITED STATES PATENTS 2,945,892   7/1960   Klager _____ 260—645

CARL D. QUARFORTH, *Primary Examiner.*

L. DEWAYNE RUTLEDGE, *Examiner.*

L. A. SEBASTIAN, *Assistant Examiner.*